July 2, 1935.  L. LOETSCHER  2,006,900
HYDRANT AND OTHER VALVE
Filed Sept. 29, 1934
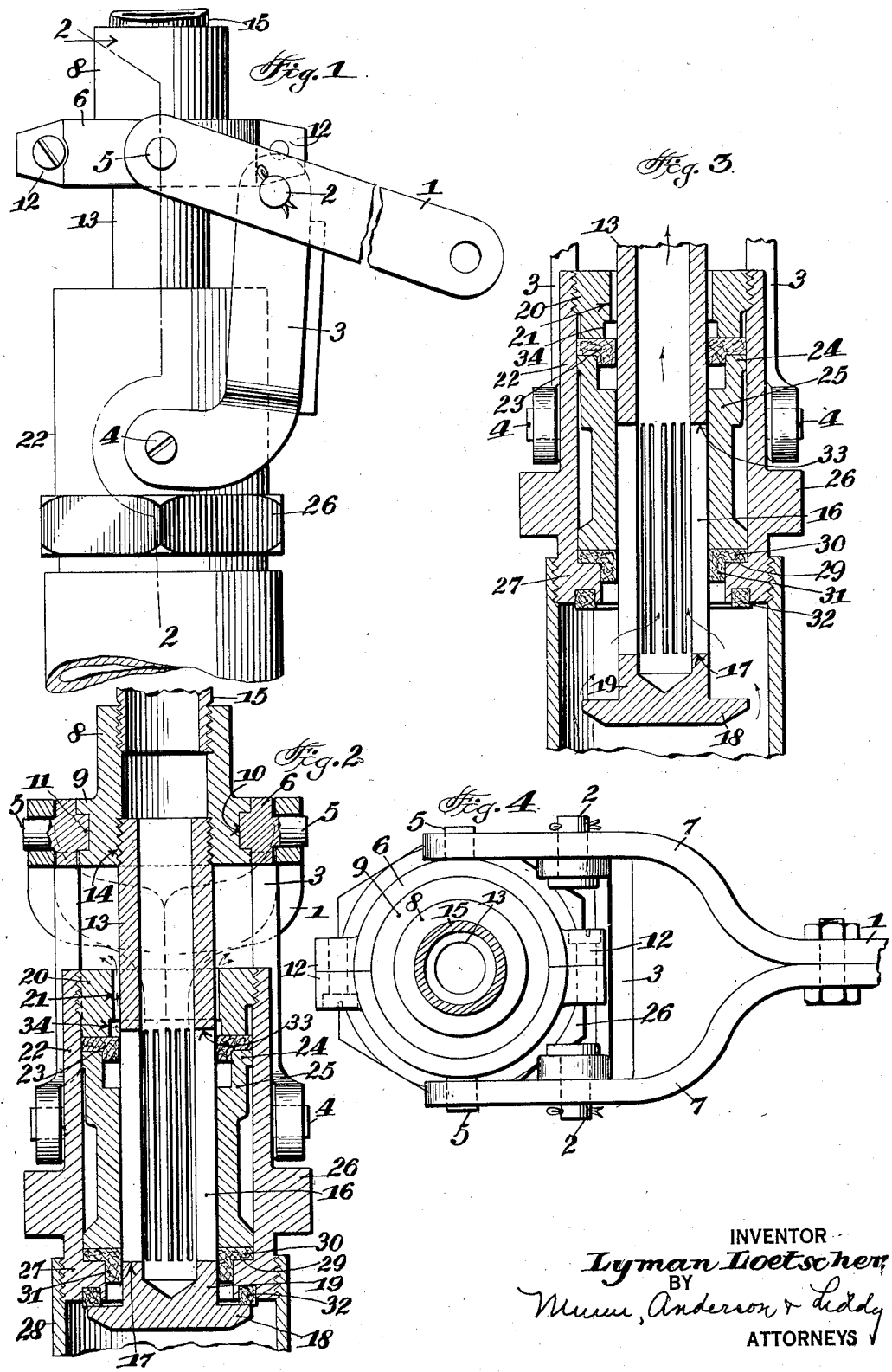
INVENTOR
Lyman Loetscher,
BY
Munn, Anderson & Liddy
ATTORNEYS Patented July 2, 1935

2,006,900

UNITED STATES PATENT OFFICE 2,006,900

HYDRANT AND OTHER VALVE

Lyman Loetscher, Livingston, Mont., assignor of one-half to Eric S. Bremner, Billings, Mont.

Application September 29, 1934, Serial No. 746,249

4 Claims. (Cl. 137—13)

This invention relates to improvements in valves, and its objects are as follows:—

First, to provide a stop and waste valve, commonly called a hydrant valve, the principle of which is capable of embodiment in other types of valves, for instance globe valves and faucets.

Second, to provide a valve in which the flow of water or other fluid is shut off before the valve member is fully closed.

Third, to provide a valve in which the waste passage is closed either immediately upon or shortly after moving the valve member toward the open position, said passage being open while the valve member is in the closed position to enable the drainage of waste water and prevent the freezing of the water in the pipe above the frost line.

Other objects and advantages will appear in the following specification, reference being had to the accompanying drawing in which:

Figure 1 is a side elevation of the improved valve.

Figure 2 is a vertical section of the valve taken on the line 2—2 of Figure 1, showing the valve member in the closed position.

Figure 3 is a similar sectional view showing the valve member in the open position.

Figure 4 is a plan view of the valve, a part being in section.

In carrying out the invention, provision is made of an operating lever 1 which is intended to be manually operated for moving the valve member into open and closed positions. It is conceivable that the lever can be operated mechanically, but this is a variation which does not have to be considered here. This lever is pivoted at 2 on a movable fulcrum 3 which partakes of the movement necessary to accommodate the action of the lever 1 by virtue of being pivotally mounted at 4. The operating lever is pivoted to the trunnions 5 of a collar 6, the lever 1 being forked at 7 (Fig. 4) both for the purposes of the pivots 2 and trunnions 5.

A ring 8 has a circular terminal flange 9 (Fig. 2) which is annularly grooved at 10 to contain a corresponding rib 11 on the inside of the collar 6. This collar is made in two parts (Fig. 4), and when these are clamped together at 12 the resultingly continuous collar together with the ring 8 provides a connection between the lever 1 and a tubular valve member 13.

The upper end of this member is screwed into the lower end of the bore of the ring 8 as at 14. An outlet pipe 15 is screwed into the upper end of the bore. Water or other fluid entering the valve member 13 from below when said member is open, flows upwardly and out of the pipe 15. The lower portion of the valve member has openings 16. These are shown as longitudinal slots running with the axis of the valve member. The openings may be of designs other than slots without departing from the principle of operation, but the slots are herein adopted because they afford the most ample water or other fluid inlets. The zone of openings is approximately as long as half the length of the valve member, the lower line 17 of the zone stopping short of the closure head 18 of the valve so as to leave a cylindrically intact portion 19 adjacent to the head and between the head and lower line 17. As the lever 1 is operated, the valve member 13 is bodily moved down and up to open and close the valve.

A compression collar 20 has a bore 21 for the valve member 13, the bore being oversized with respect to the diameter of the valve member so as to provide a waste passage through which water or other fluid can drain from the pipe line above when the valve member is fully closed. The collar 20 screws into a valve body 22 and compresses the flange of a leather or other packing 23 upon the enlarged rim 24 of a compression sleeve 25. The valve body carries the pivotal mounting 4 previously referred to. This is in the form of screws which are driven into the valve body.

This sleeve is situated in the valve body 22 which, obviously, is made hollow. The body has a non-circular portion 26 for the purpose of a wrench. It terminates at the bottom in an externally threaded nipple 27 which screws into a standard pipe fitting 28. Water or other fluid enters at the pipe fitting and passes upwards through the valve. The nipple 27 is internally enlarged to provide a shoulder 29. A packing 30, similar to 23, rests on the shoulder, and is compressed thereupon by the sleeve 25 when the collar 20 is screwed home. The packings 23, 30 are hereinafter known as the upper and lower packings. It is between them and on the wall of the bore of the sleeve 25 that the valve member 13 is slidable.

It is to be observed that the openings 16 are of less axial extent than the farthest spaced apart ends of the upper and lower packings 23, 30. This provision insures a shutting off of the fluid flow prior to the full closing of the valve member 13. This preliminary shutting occurs when the lower line 17 of the zone of openings passes the bottom of the skirt 31 in the upward travel of the valve member. At such time the head 18 has as yet not engaged a leather seat and final stop 32, which it does when the valve is fully closed as in Figure 2. At that time the packing 31 and stop 32 provide a double seal for the valve, either one being capable of preventing water or other fluid from passing into and through the valve.

Reverting to the openings 16, it is to be observed that the upper line 33 of the zone of openings extends above the top of the upper packing 23 when the valve is fully closed (Fig. 2). Communication is then had with a slightly enlarged chamber 34 from which the oversized bore 21 branches off. Drainage occurs from the inside of the valve member 13 into the passage 21, letting out waste water from the pipe line above and preventing freezing as previously pointed out.

The operation is readily understood. As long as the valve member 13 remains in the closed position (Fig. 2) there is an absolute double seal-off at the bottom because of the two packings 31, 32, and a drainage through the waste passage 21 as long as there is a head of water in the pipe line and valve member above the upper packing 23.

Opening of the valve is accomplished by raising the lever 1. This depresses the valve member 13. The amount of water or other fluid permitted to pass through the valve is regulated by the amount of raising of the lever. The latter can be raised far enough to fully open the valve (Fig. 3), final opening being limited by the bottom of the flange 9 striking the top of the collar 20. The initial unseating of the head 18 does not start the flow of water. It is not until the lower line 17 of the zone of openings passes the bottom of the skirt 31 of the lower packing 30 that water commences to flow.

Considering the operation in the reverse order, the flow of water is cut off between 17 and 31 before the head 18 engages the final stop 32. The advantage in this lies in the fact that the final seal-off is made in the absence of a flowing current which might possibly carry with it enough sediment to injure the sealing surfaces in the closing action.

Inasmuch as the ring 8 responds to the motions of the collar 6 when the lever 1 is worked as described, it follows that the motions of the pipe 15 must be accommodated. Hydrant valves usually are set in a box (not shown) about three feet square so that a workman can get down below the frost line to make repairs to valves if necessary. This box has a trap door on top through which a hose may be attached to the pipe 15, allowing the foregoing motion. In practice a suitable kind of a guide, fastened to the box, can be provided for the pipe 15.

I claim:—

1. A valve comprising a valve body having fixed upper and lower packings spaced apart, and a tubular valve member and means for sliding it to open and closed positions in the packings, said member having a closure head for the lower end and at least one opening occupying a zone of such extent that the bottom of the opening moves into the lower packing for a seal-off before the top of the opening passes out of the upper packing, the top of said opening extending above the upper packing when the valve member is in a fully closed position and having communication with the atmosphere.

2. A valve comprising a valve body having fixed upper and lower packings spaced apart, a tubular valve member and means for sliding it in the packings to open and closed position, said member having a closure head for the lower end and at least one opening the extent of which is less than the distance between the farthest spaced apart ends of the packings so that the top of the opening is exposed above the upper packing while the bottom of the opening is sealed off in the lower packing when the valve body is fully closed, and means attached to the body by which the packings are held in place, said means having a bore oversized with respect to the valve member to provide a waste passage with which the exposed end of said opening is adapted to communicate.

3. A valve comprising a valve body having an internal shoulder, a compression sleeve and upper and lower packings at its respective upper and lower ends, a collar fastened to the body for compressing the packing and sleeve assemblage against the shoulder, a tubular valve member and means for sliding it in the sleeve and packing assemblage, said member having at least one opening occurring within the assemblage, and having a closure head situated beneath the body, said collar having a bore oversized with respect to the valve member to provide a waste passage communicating with said opening when the valve member is closed, and a seat on the body then engaged by the closure head.

4. A hollow valve member and an outlet pipe, a ring by which said member and pipe are joined in fluid communication, means to move the ring and thereby move said member and pipe as a unit to open and closed positions of said valve member, a valve body in which said member is movable and which has a seat with which the member coacts to assume said positions, and means both in the valve member and body through which a head of fluid in the pipe is adapted to drain when the valve member is in the closed position.

LYMAN LOETSCHER.